(12) United States Patent
Schomaker et al.

(10) Patent No.: US 6,456,203 B1
(45) Date of Patent: Sep. 24, 2002

(54) POWER DISTRIBUTION PANEL WITH MODULAR ELEMENTS

(75) Inventors: David E. Schomaker, Lino Lakes, MN (US); Carlos Arroyo Gonzalez, Juarez (MX); Delfino Hernandez, Juarez (MX); Luis Manuel Sanchez Aguilar, Juarez (MX); Narciso Delgado Guevara, Juarez (MX); Celsa Mora Curiel, Juarez (MX)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/541,340

(22) Filed: Apr. 3, 2000

(51) Int. Cl.[7] ................................................ G08B 21/00
(52) U.S. Cl. ................. 340/638; 340/693.5; 340/693.9; 174/65 R; 361/626; 361/636; 361/638; 361/640; 361/641; 361/642; 361/656
(58) Field of Search .............................. 340/638, 693.5, 340/693.11, 693.9; 174/50, 65 R; 361/600, 601, 622, 626, 627, 634, 636, 638, 640, 641, 642, 643, 652, 656

(56) References Cited

U.S. PATENT DOCUMENTS 5,204,800 A * 4/1993 Wasney ........................ 361/111
6,160,699 A * 12/2000 Gibson et al. ............... 361/643

FOREIGN PATENT DOCUMENTS

| CH | 300420 | 10/1954 |
|---|---|---|
| DE | 36 28 130 C1 | 11/1987 |
| GB | 2 018 031 A | 10/1979 |

OTHER PUBLICATIONS

Hendry Telephone Products document, 2 pages, entitled "Power Distribution, Flexible Series," dated Feb. 1998, pp. 6 and 7.
Hendry Telephone Products document, 2 pages, entitled "Power Distribution, High Density", dated Feb. 1998, pp. 9 and 10.
Hendry Telephone Products document, 2 pages, entitled "Power Distribution, Intelligent," dated Feb. 1998, pp. 17 and 18.
Hendry Telephone Products document, 2 pages, entitled "Power Distribution, Traditional," dated Feb. 1998, pp. 23 and 24.

(List continued on next page.)

Primary Examiner—Julie Lieu
(74) Attorney, Agent, or Firm—Merchant & Gould P.C.

(57) ABSTRACT

A power distribution panel having circuit elements such as KTK and GMT fuses removably mounted to a unit housing by means of module members, thereby allowing for ease of customization of the circuit elements of the power distribution panel.

24 Claims, 18 Drawing Sheets

OTHER PUBLICATIONS

Telect.com catalog page entitled "Uninterrupted Battery Fuse Panel," copyright 1999, p. 7.

Telect.com catalog page entitled "Intermediate Fuse Panels," copyright 1999, p. 8.

Telect.com catalog, 2 pages entitled "Circuit Breaker Panel," copyright 1999, pp. 9 and 10.

Telect.com catalog, 2 pages entitled "High Current Circuit Breaker Panel," copyright 1999, pp. 11 and 12.

Telect.com brochure, 2 pages, entitled "Two Fuse Panels in One Rack Space–Intermediate Fuse Panel," dated Jul. 1998.

Printouts from www.telect.com dated Mar. 22, 2000, entitled "Telect, Fuse Panels", 2 pages.

Printouts from www.telect.com dated Mar. 22, 2000, entitled "Telect's Traditional Fuse Panels," 3 pages.

Printouts from www.telect.com dated Mar. 22, 2000, entitled "Telect's Total Front Access Fuse Panels," 2 pages.

Printouts from www.telect.com dated Mar. 22, 2000, entitled "Telect's Intermediate Fuse Panels," 2 pages.

Printouts from www.telect.com dated Mar. 22, 2000, entitled "Telect, Circuit Breaker Panel," 2 pages.

Printouts from www.telect.com dated Mar. 30, 2000, entitled "Telect's Uninterrupted Battery Fuse Panel," 4 pages.

* cited by examiner

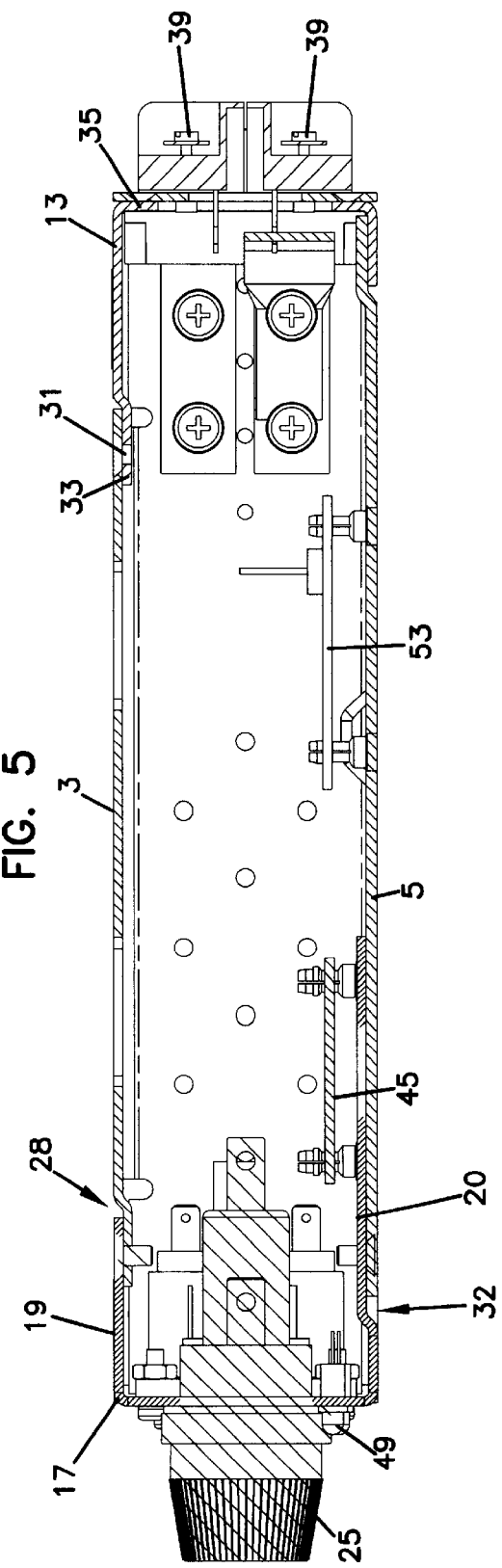
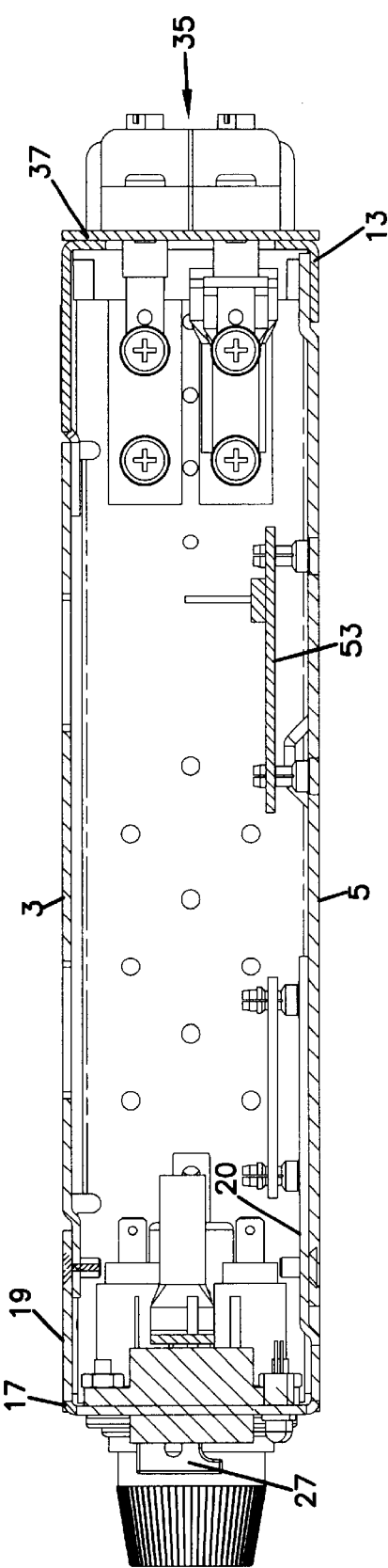

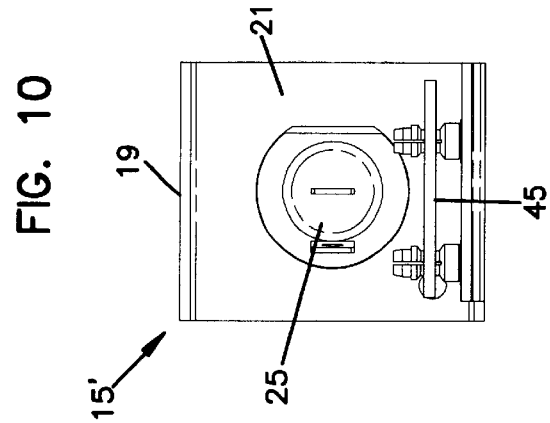
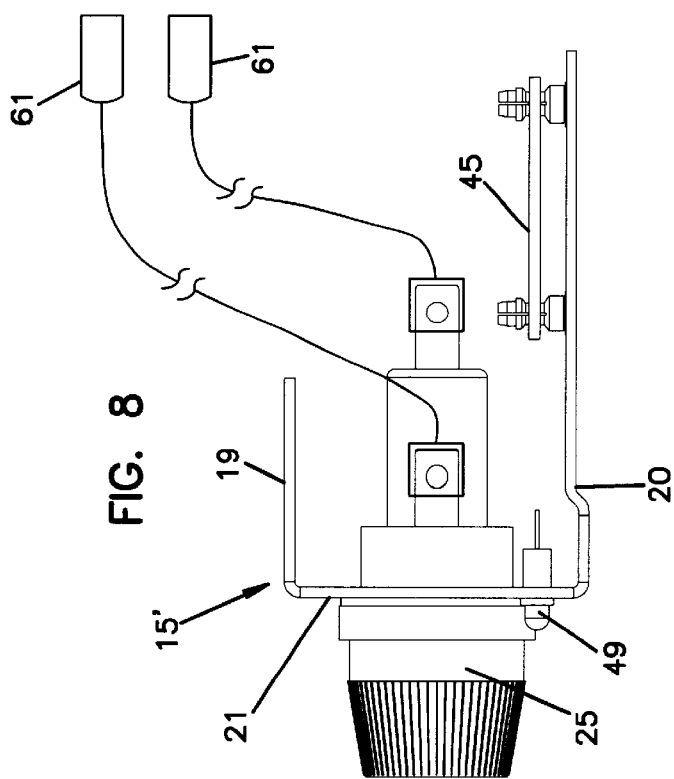
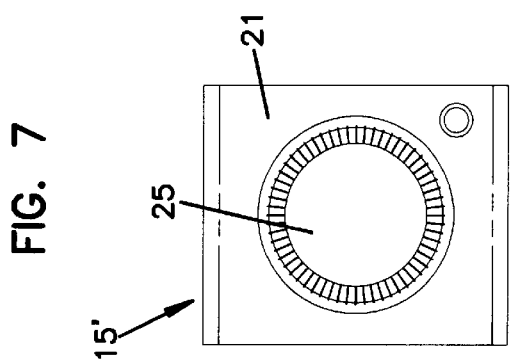

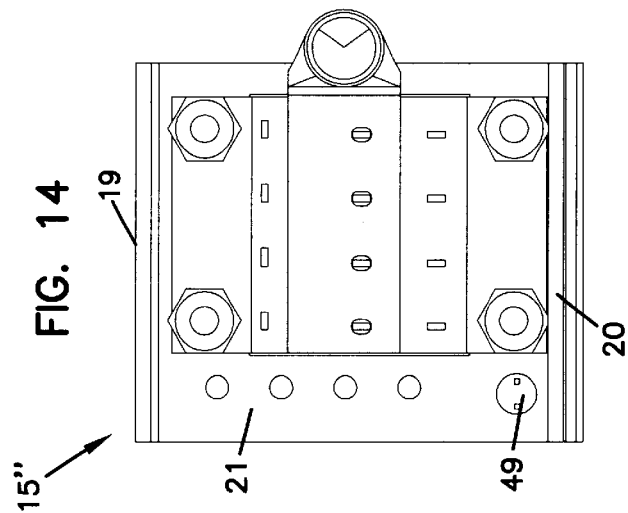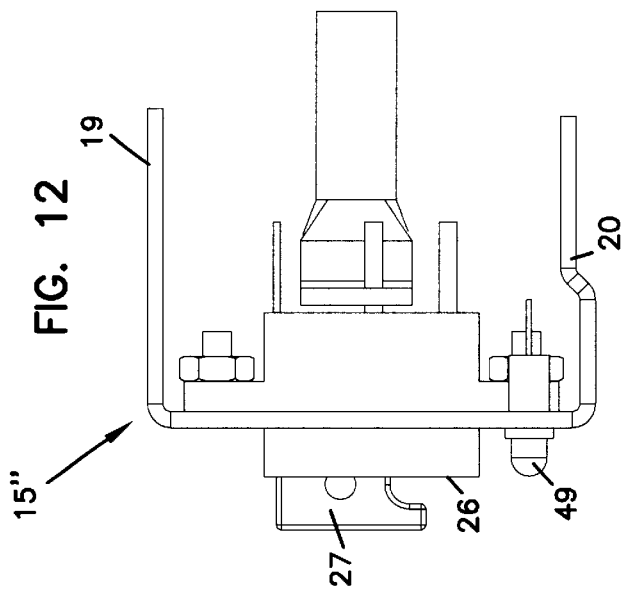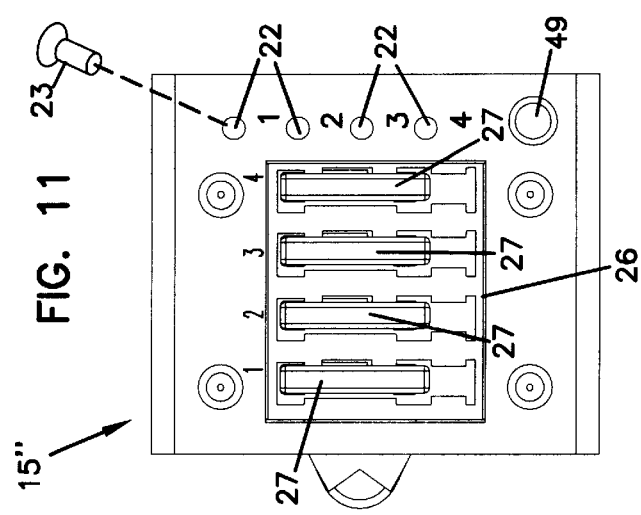

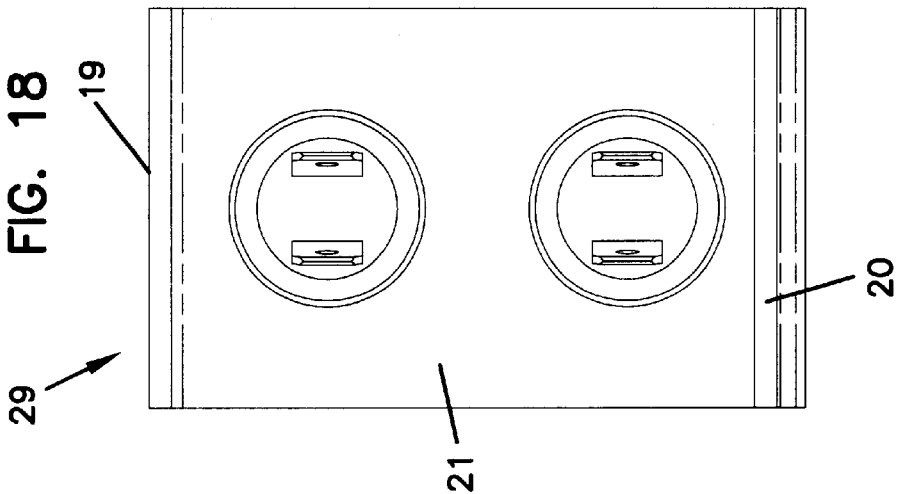
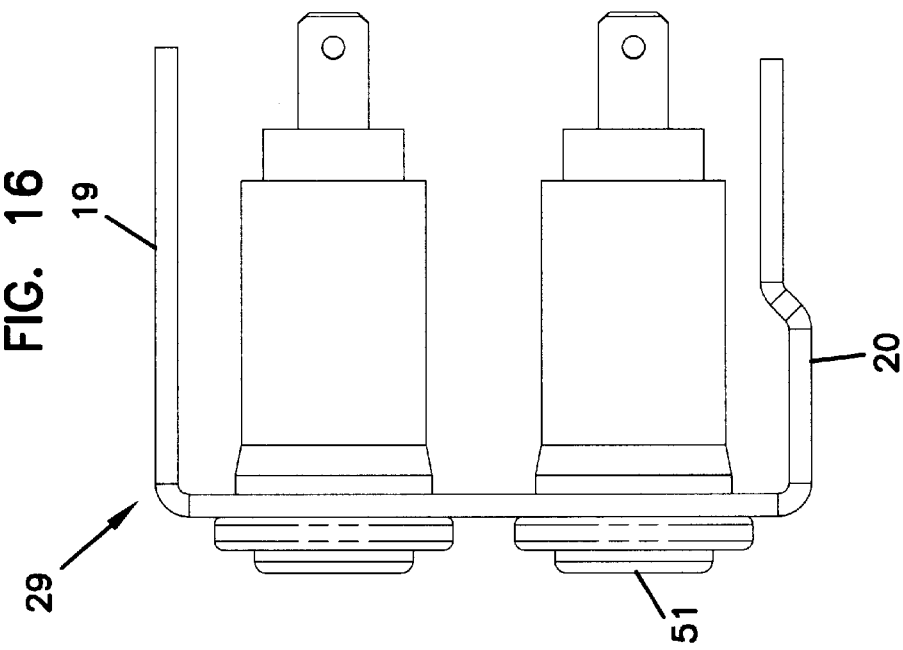
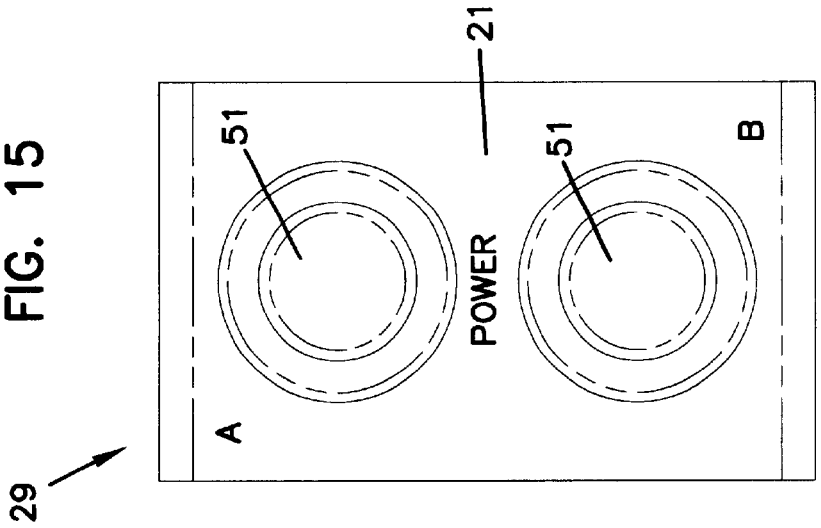

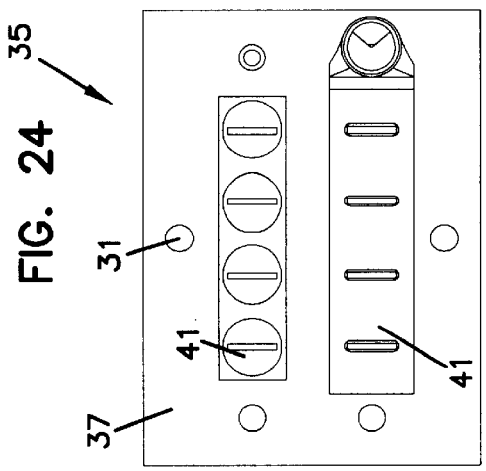
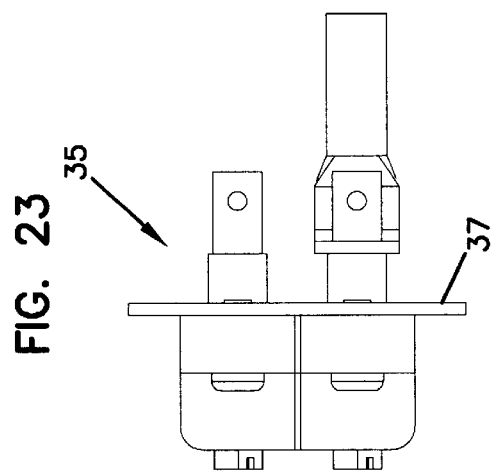
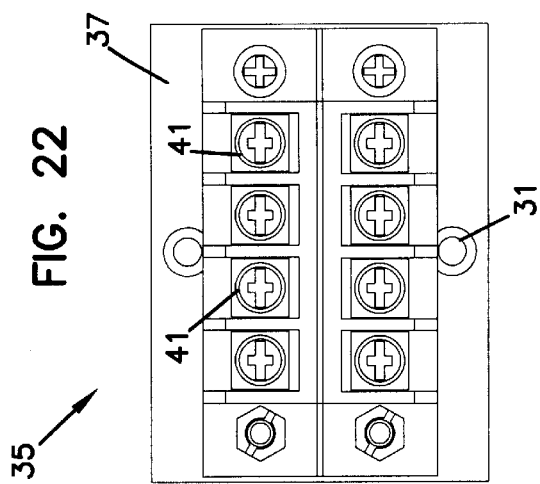

POWER DISTRIBUTION PANEL WITH MODULAR ELEMENTS

FIELD OF THE INVENTION

The present invention relates to a power distribution panel with circuit element modules.

BACKGROUND OF THE INVENTION

Electrical circuit panels such as power distribution panels typically include a number of different circuit elements such as fuse holders and fuses, circuit breakers, input and output connectors, and alarm signal LEDs. For safety and other reasons, the electrical circuits of power distribution panels are enclosed within a housing structure. Therefore, the circuit elements listed above have typically been inserted into holes which have been pre-cut or pre-punched into the housing structure, usually on a front or back panel of the housing structure. These prior circuit panels are fixed in that once the holes are formed in the housing, the type and arrangement of the components is limited.

In order to manufacture different fixed circuit panels of the prior systems, a circuit panel manufacturer would punch out different patterns of holes in the front or back panels of the housing structure in order to accommodate different arrangements of circuit elements. Significant retooling time and costs are involved for offering different fixed panels. Assembly of the circuit elements is also difficult when the elements are inserted through the holes. There is a need for further circuit panels which allow for more efficient manufacture and use.

SUMMARY OF THE INVENTION

The present invention is an improved circuit panel such as a power distribution panel constructed with circuit element modules. The circuit element modules eliminate the need for punching patterns of specially shaped holes into a front and/or back panel of the housing structure for each element. The circuit elements are disposed on modular members of standardized dimensions which allow the elements to be coupled to the housing structure in one of a variety of selected configurations without the need to customize a hole pattern in a front panel of the housing structure. Eliminating the discrete hole punching increases the ease of producing variable product line or customized circuit panels and results in quicker delivery to the customer.

BRIEF DESCRIPTION OF THE DRAWINGS

FIG. 5 is a cross-sectional side view defined by line A—A in FIG. 2.

FIG. 6 is a cross-sectional side view defined by line B—B in FIG. 2.

FIG. 7 is a front view of one embodiment of a KTK/KLM-type fuse holder module with KTK/KLM-type fuse configured according to the present invention.

FIG. 8 is a side view of the KTK fuse module of FIG. 7.

FIG. 10 is a rear view of the KTK fuse module of FIG. 7.

FIG. 11 is a front view of one embodiment of a GMT-type fuse holder module with four GMT fuse holder locations and fuses configured according to the present invention.

FIG. 12 is a side view of the four position GMT fuse module of FIG. 11.

FIG. 14 is a rear view of the four position GMT fuse module of FIG. 11.

FIG. 15 is a front view of one embodiment of a power on LED indicator module configured according to the present invention.

FIG. 16 is a side view of the power on LED indicator module of FIG. 15.

FIG. 18 is a rear view of the power on LED indicator module of FIG. 15.

FIG. 22 is a front view of a GMT-type output connector module with GMT output connectors as it would appear if viewing the back of the power distribution panel.

FIG. 23 is a side view of the GMT output connector module of FIG. 22.

FIG. 24 is a rear view of the GMT output connector module of FIG. 22.

DETAILED DESCRIPTION OF THE PREFERRED EMBODIMENTS

Figure 1:
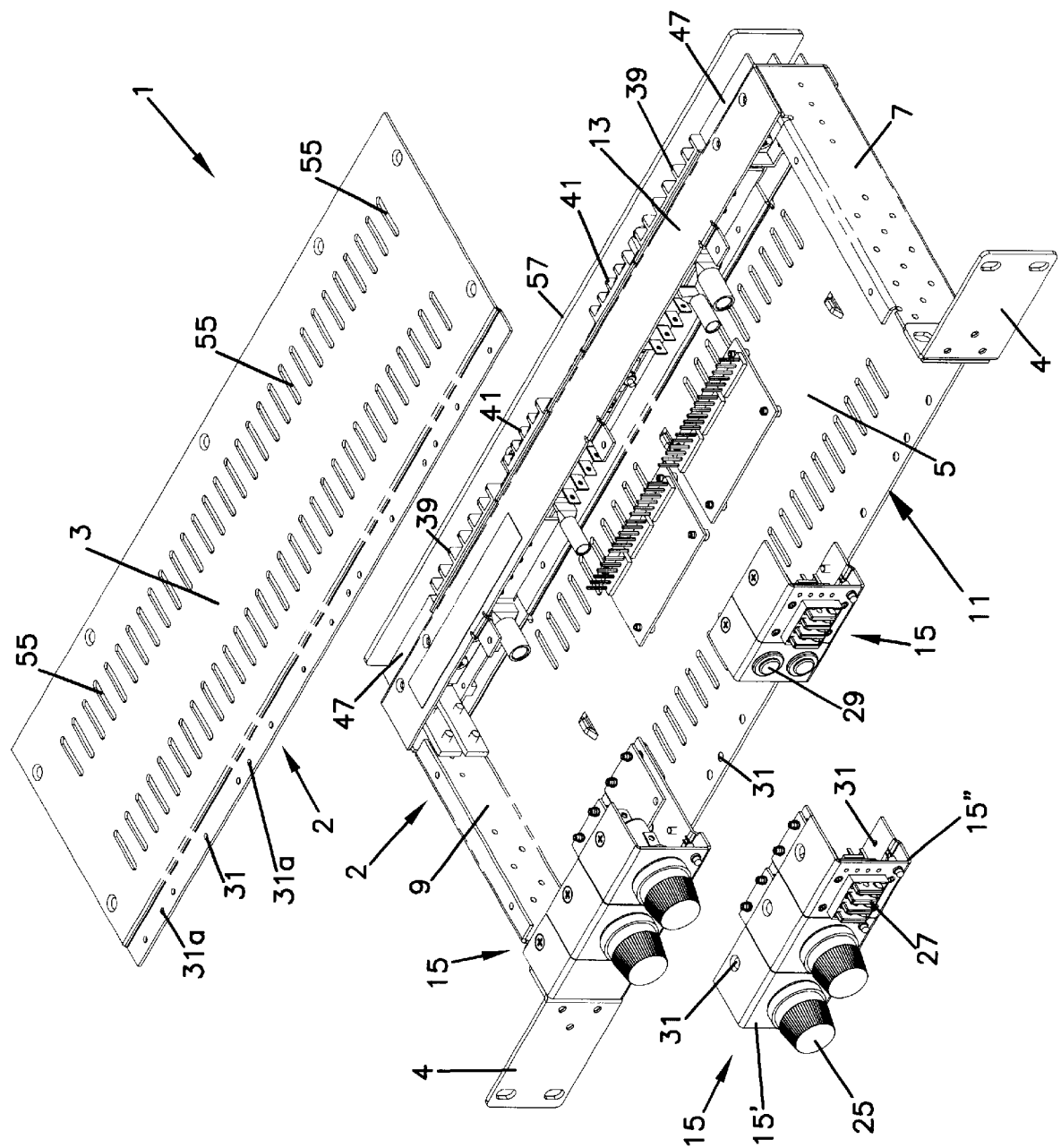
FIG. 1 is an exploded view of one preferred embodiment of a power distribution panel with circuit element modules according to the present invention.
Figure 2:
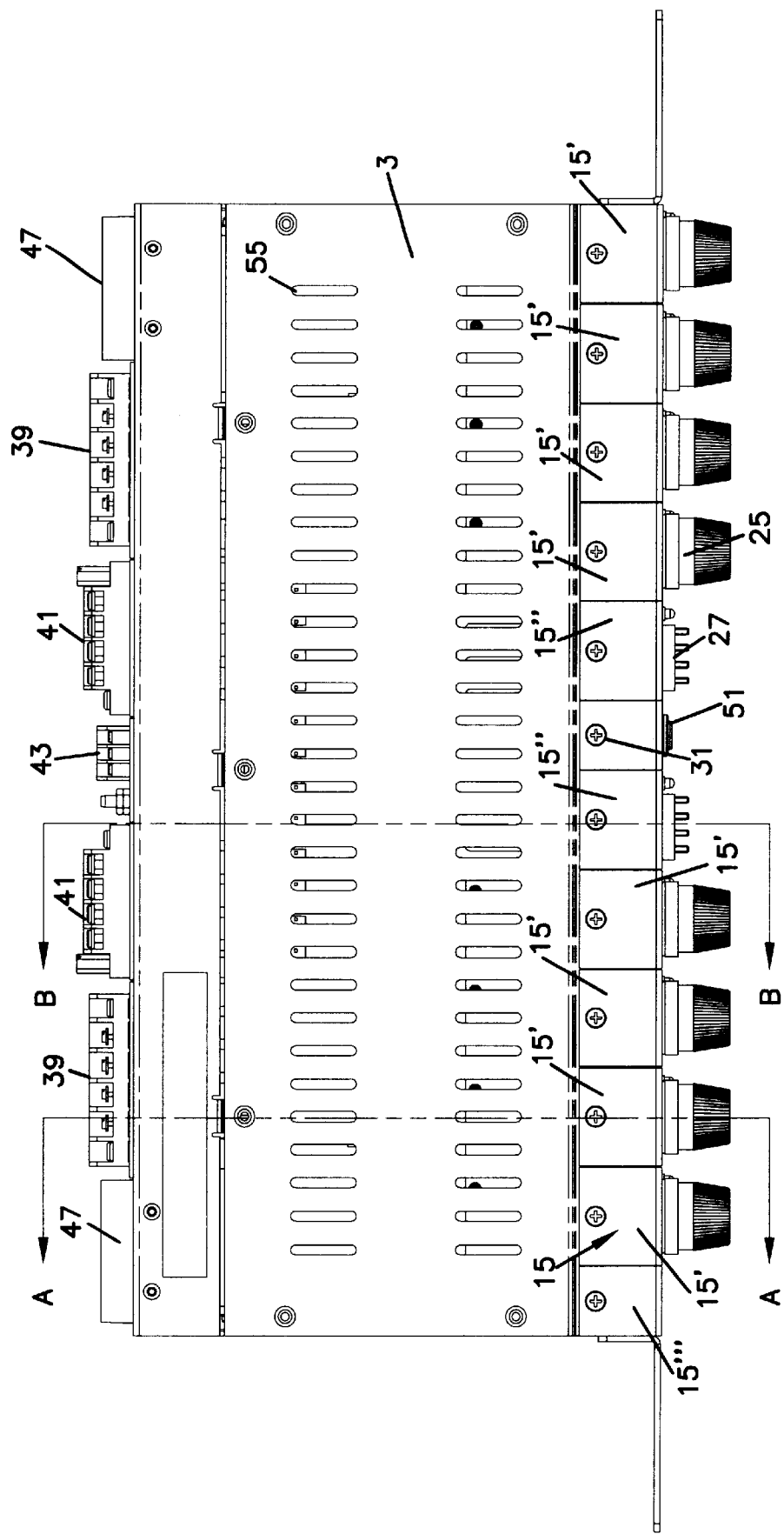
FIG. 2 is a top view of the preferred embodiment of the power distribution panel of FIG. 1.
Figure 3:
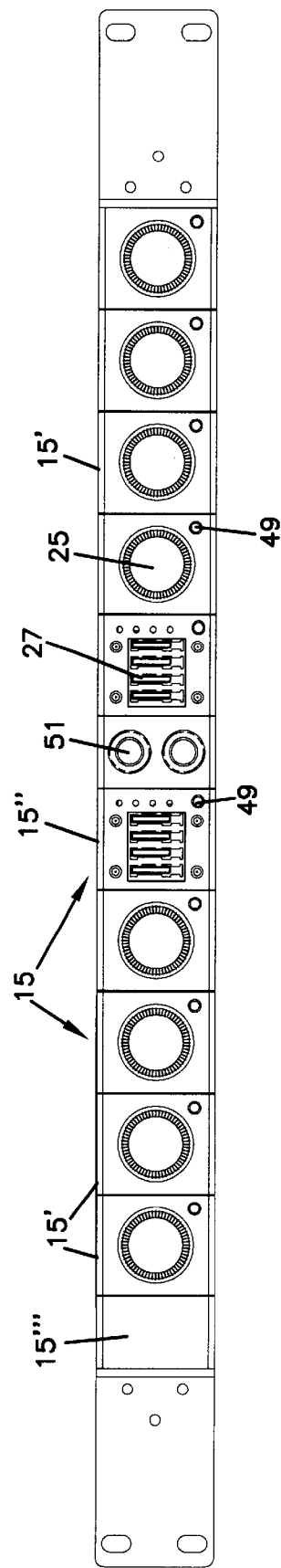
FIG. 3 is a front view of the preferred embodiment of the power distribution panel of FIG. 1.

A power distribution panel is a circuit panel which channels power from a supply line input power to a number of different pieces of equipment. Therefore, a power distribution panel typically has one or more power input connections and an array of output connections to which the pieces of equipment to be supplied with power are connected. The typical power distribution panel also comprises an array of fuse locations, normally one fuse location for each output connection. Alternatively, or in combination, circuit protection may be provided by circuit breakers. This specification and accompanying drawings relate to preferred embodiments of a power distribution panel primarily with fuse modules but it is to be understood that the present invention is applicable to other types of circuit panels using other circuit element modules such as circuit breaker modules, other circuit protection modules, or other circuit element modules with different functions altogether.

As shown in the preferred embodiment of FIGS. 1–31, a power distribution panel 1 is shown having a unit housing 2 with a top panel 3, a bottom panel 5, and two side panels 7 and 9. The top, bottom and two side panels define a front end 11 of the unit housing 2. The unit housing 2 also includes a back panel or portion 13. The back portion 13 is coupled to the top and bottom panels 3 and 5 of the unit housing to form a back end of the unit housing. In the preferred embodiment, the unit housing 2 is made of sheet metal or molded plastic. Mounting brackets 4 are provided along the side for mounting panel 1 to a rack, frame or other equipment supporting structure.

The panel 1 of the present invention presents a configurable housing or chassis that allows use of the common chassis with various modular components that define the circuit functionality of the panel. The preferred panel 1 includes modular constructions for the fuse or other circuit protection components, and modular constructions for the power output connectors, status and alarm indicators, and alarm signal connectors.

Figure 32:
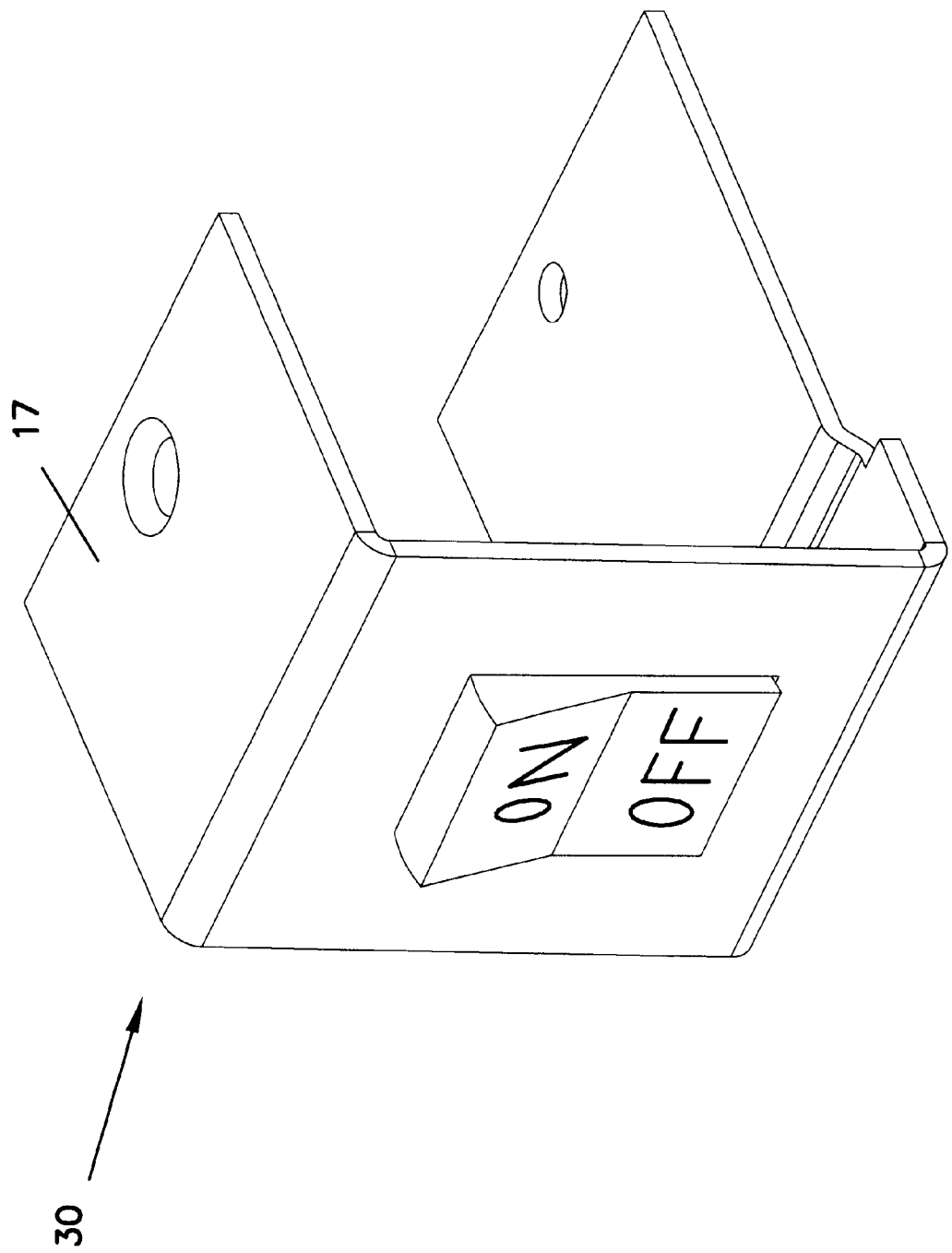
FIG. 32 is a circuit breaker module according to the present invention.

The present invention couples circuit element modules 15 onto the front end 11 of the fuse panel. Each circuit element module 15 preferably includes a circuit element mounted onto a generally C-shaped module member 17 having upper and lower flange surfaces 19 and 20 which are connected by a middle front surface 21. The circuit element 15 may be, for example, a KTK/KLM-type fuse holder location 24 for a KTK fuse 25 as shown in FIGS. 7–10, an array of GMT-type fuse holder locations 26 for GMT fuses 27 as shown in FIGS. 11–14, a power on indicator LED 29 as shown in FIGS. 15–18, a circuit breaker 30 as shown in FIG. 32, TPS-type fuses, or TPA-type fuses, or any other circuit protector element or other circuit element.

The module members 17 are configured to fit the front end of the unit housing. The module members 17 may be made from bent and cut sheet metal, or from plastic. The module members 17 are made in standardized sizes and shapes, allowing assembly of the fuse panel to easily and efficiently vary a product line or customize the configuration in a particular manner. The manufacturer or the customer may choose the number and type of fuses, circuit breakers, and other circuit elements desired up to the capacity of the power distribution panel which is governed by the width and height of the panel. In some applications, the circuit elements in the power distribution panel can be changed as the user's needs change or as elements need replacement or upgrading.

As shown in FIGS. 5 and 6, the top panel 3 may be recessed at recess 28 to receive the upper flange surfaces 19 of the module members 17, presenting a generally planar top surface of the panel 1. In a similar manner, the lower flange surfaces 20 of the module members 17 may be recessed at recess 32 to receive the bottom panel 5, presenting a generally planar bottom surface of the panel 1.

The top panel 3 and the upper flange surfaces 19 of the module members 17 define fastener holes or perforations 31 for coupling the circuit element modules 15 to the panel 1. Additionally, the bottom panel 5 and the lower flange surfaces 20 of the module members 17 may define fastener perforations 31. Due to the C-shaped configuration of the module members the circuit element modules are coupled to the panel 1 without devoting space on the middle front surfaces 21 of the module members 17 to fastener perforations and fasteners. By placing the fasteners and fastener perforations 31 on upper and lower flange surfaces 19 and 20 and not on the middle front surface 21, more circuit element modules 15 may be fitted into the same size panel. Fastener perforations 31 on top and bottom panels 3, 5 are positioned in desired patterns, preferably repeating or equally spaced patterns to facilitate increased versatility of panel 1. The repeating patterns may be sequential, or mirror images. Some perforations may not be used for each panel 1, depending on the length of the modules.

Figure 17:
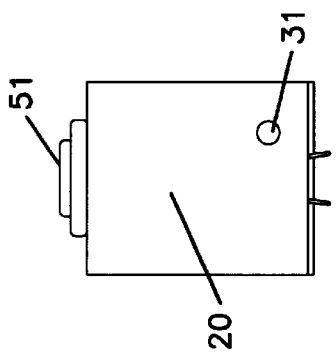
FIG. 17 is a bottom view of the power on LED indicator module of FIG. 15.
Figure 9:
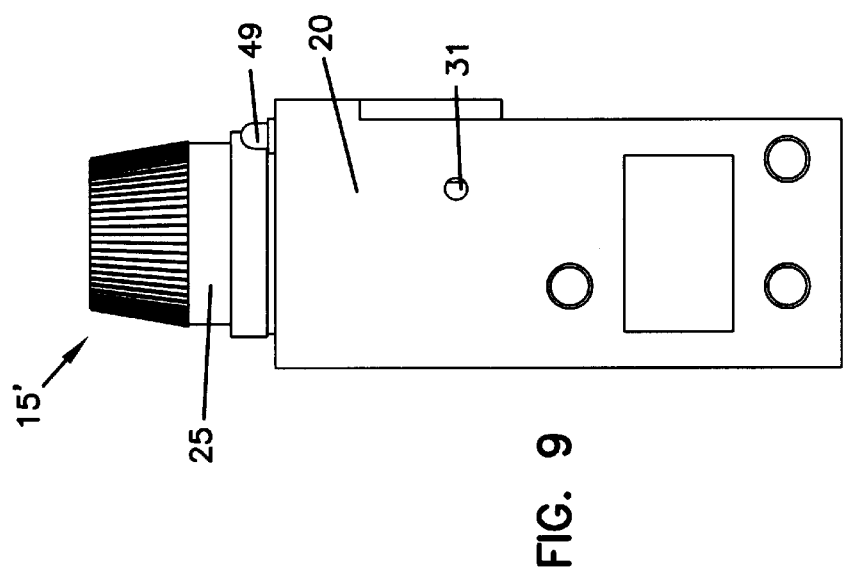
FIG. 9 is a bottom view of the KTK fuse module of FIG. 7.
Figure 13:
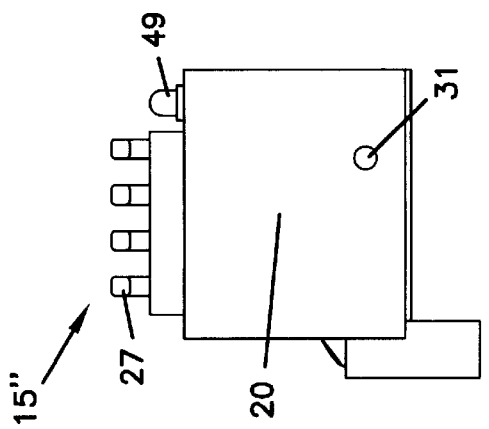
FIG. 13 is a bottom view of the four position GMT fuse module of FIG. 11.

The fastener perforations 31 in the upper and lower flange surfaces 19, 20 of the module members 17 are positioned not to have their axes concentric. If the single fastener perforations 31 were along concentric axes, the circuit element modules would tend to pivot around an axis defined by the fastener perforations. By positioning the fastener perforations 31 on the upper and lower flange surfaces 19 and 20 on separate vertical axes, the circuit element modules 15 are more stable and will not pivot. By more securely mounting the modules to limit rotation, a safer module and panel results since moveable modules may present electrical hazards. In FIGS. 9, 13 and 17 it can be seen that the fastener perforations 31 are off-center and therefore not aligned co-axially with the fastener perforations on the upper flange surface 19. The fastener perforation 31 in the lower flange surface 20 of the module members 17 may alternatively be sized to fit over a positioning peg disposed on the bottom panel 5 of the unit housing to prevent the modules from pivoting.

Each circuit element module 15 is sized in width to be a multiple of some unit length. For example, if the unit length were 1.5 inches, the circuit element modules could be 1.5, 3, 4.5, 6, or 7.5 inches wide or wider, up to a maximum width of the panel. A circuit element module that is 3 inches wide may be replaced by two circuit element modules that are each 1.5 inches wide. Therefore, although the GMT fuse modules shown in FIGS. 1 and 11–14, have arrays of four GMT fuse holder locations positioned on module members 1.5 inches wide, it is to be understood that larger arrays of fuse holders such as 10 fuse holder arrays could be used with the present invention simply by placing the larger arrays on module members that are, in the preferred embodiment, multiples of 1.5 inches wide, for example, 3 or 4.5 inches wide. As an alternative, the unit length may be 0.5 inches, and the modules may be multiples of 0.5 inches, with no module actually 0.5 inches in length.

Figure 4:
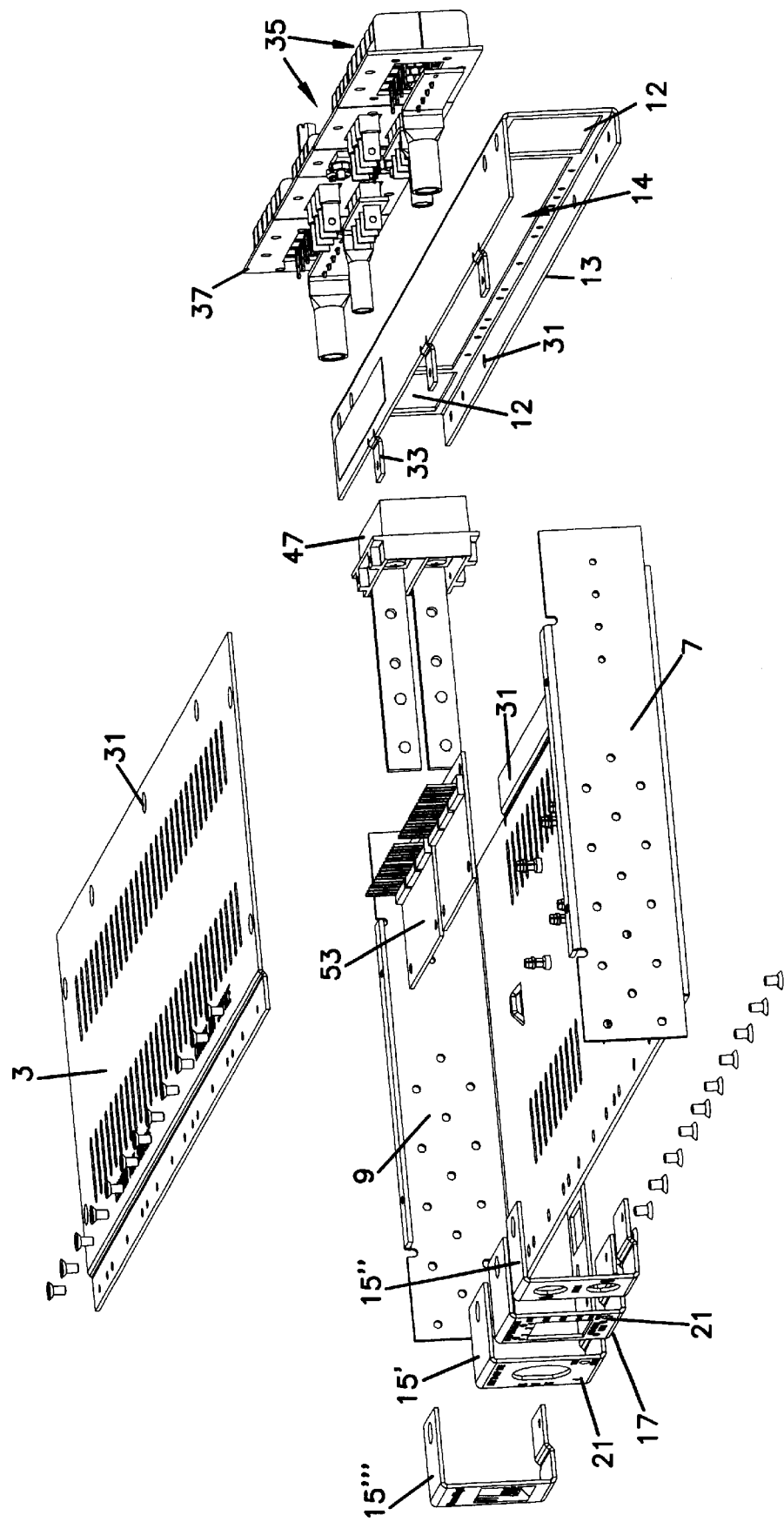
FIG. 4 is a further exploded view of the power distribution panel of FIG. 1.

Referring now to FIG. 4, the back portion 13 is coupled to the top panel 3 by fastener tabs 33 which may be recessed underneath the top panel 3, presenting a generally planar top surface of the panel 1 (see FIGS. 5 and 6). The fastener tabs 33 and top panel define fastener perforations 31 for coupling the back portion 13 to the top panel 3. The bottom panel is also coupled to the back portion 13. The bottom panel 5 may be recessed to receive the back portion 13, presenting a generally planar bottom surface of the panel 1 (see FIGS. 5 and 6).

Not only are the circuit elements modularized, but power input and output connectors may also be modularized.

Figure 21:
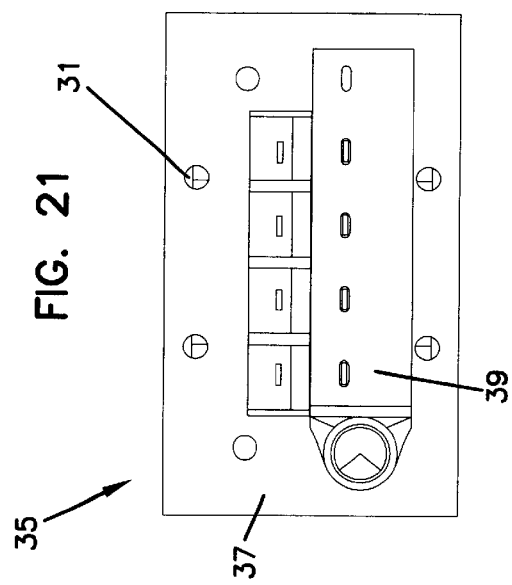
FIG. 21 is a rear view of the KTK output connector module of FIG. 19.
Figure 20:
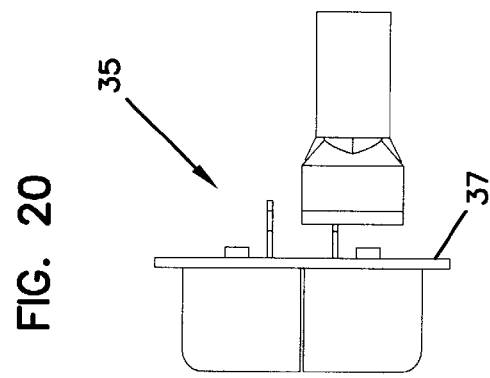
FIG. 20 is a side view of the KTK output connectors of FIG. 19.
Figure 19:
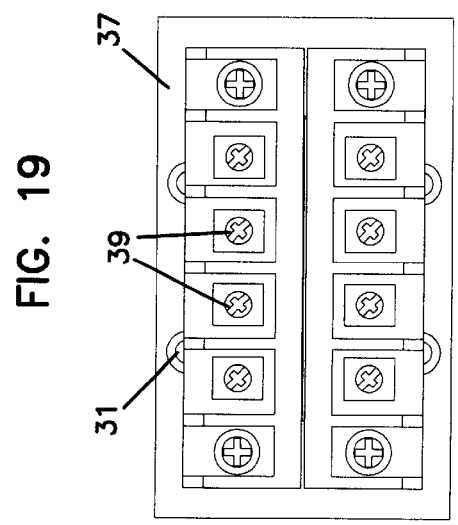
FIG. 19 is a front view of a KTK/KLM-type output connector module with KTK output connectors as it would appear if viewing the back of the power distribution panel.
Figure 27:
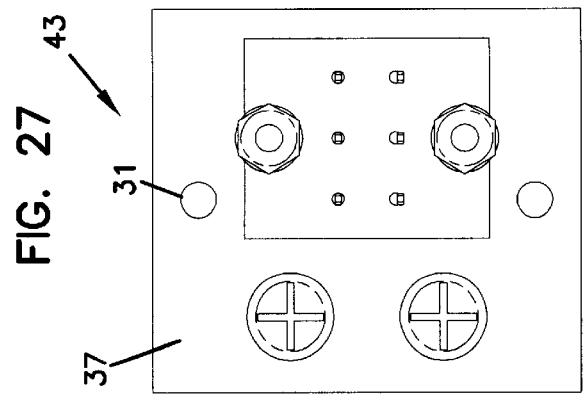
FIG. 27 is a rear view of the alarm output module of FIG. 25.
Figure 26:
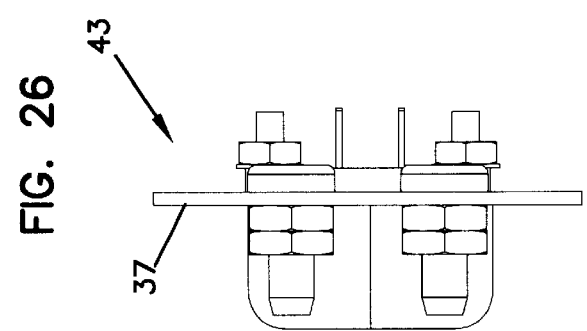
FIG. 26 is a side view of the alarm output module of FIG. 25.
Figure 25:
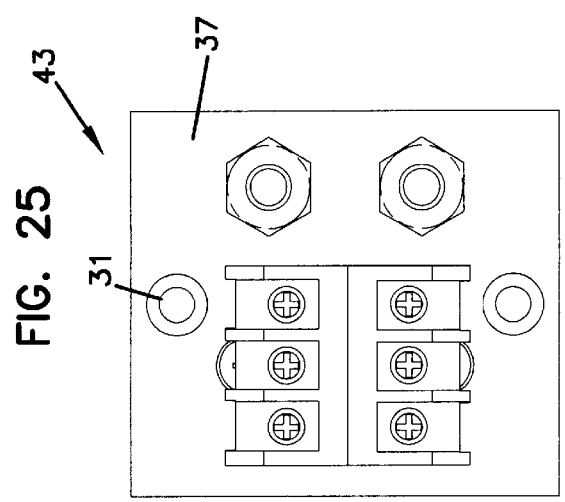
FIG. 25 is a front view of an alarm output module as it would appear if viewing the back of the power distribution panel.
Figure 28A:
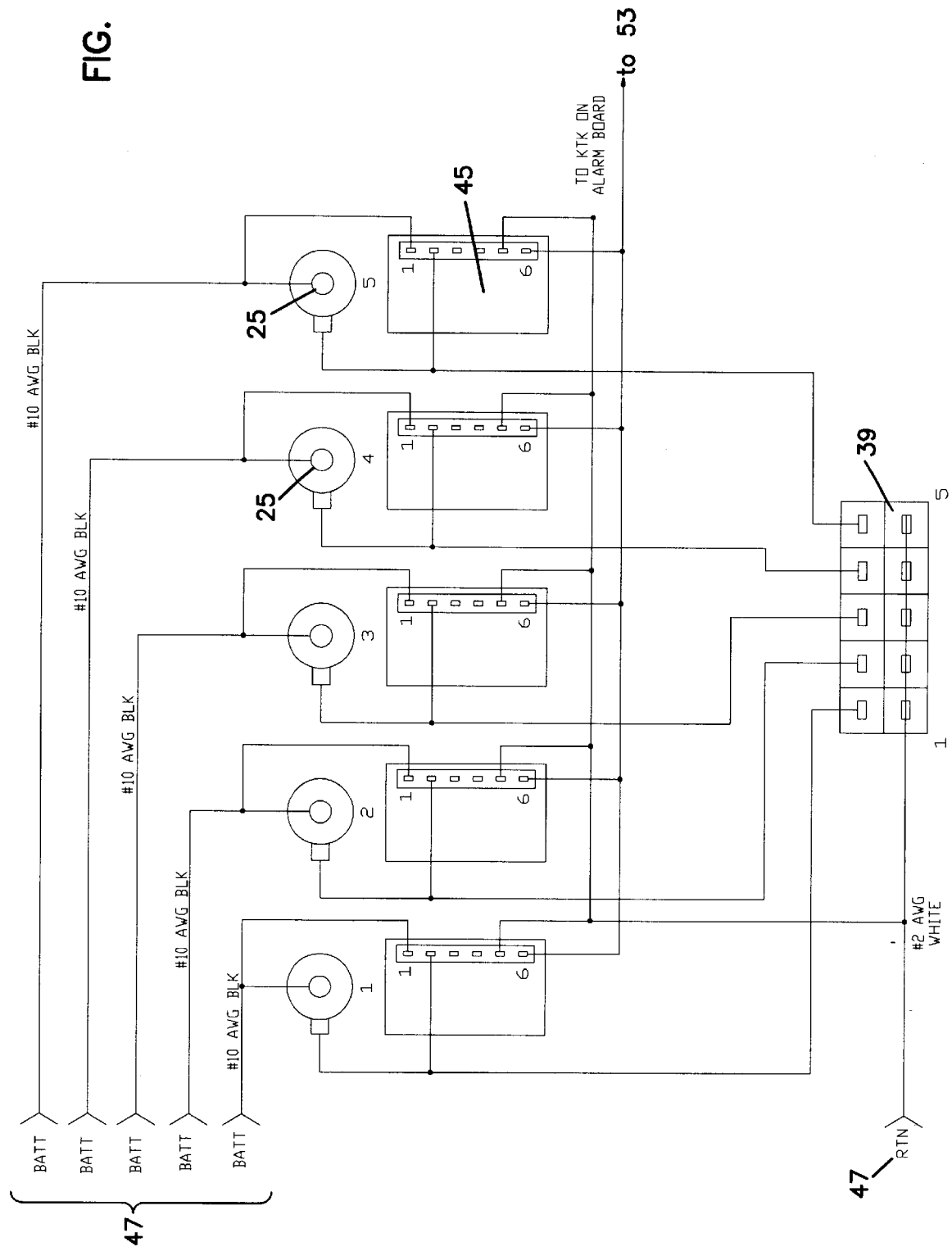
FIGS. 28A and B are circuit diagrams of a circuit used in a power distribution panel of the present invention with KTK fuses.
Figure 33:
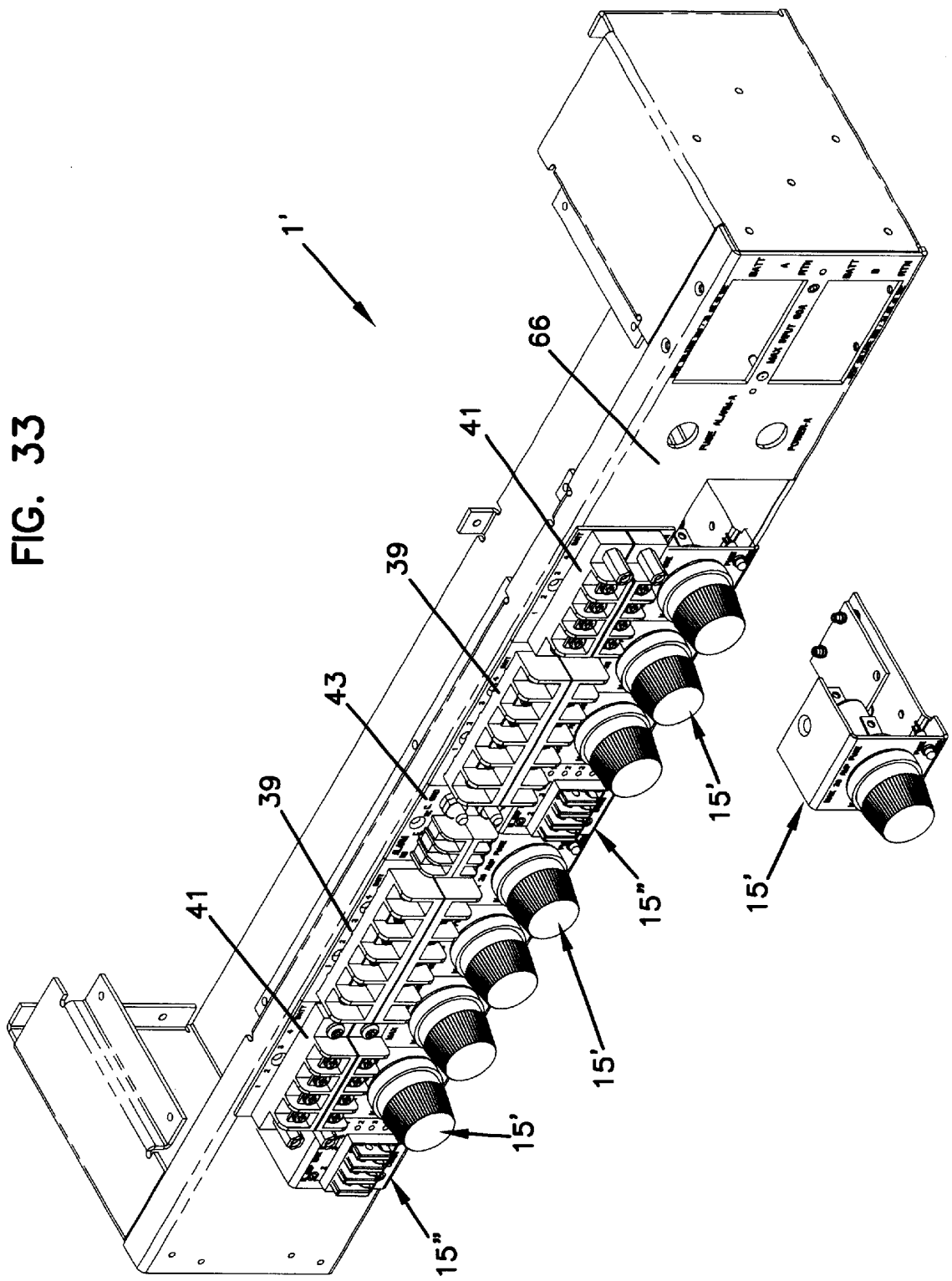
FIG. 33 is one preferred embodiment of a total front access power distribution panel.

Typically, the power input and output connectors are placed in the back portion 13 of the panel as shown in FIG. 1, but they may also be placed at the front end as shown in FIG. 33. The input and output connectors may be modularized into connector modules 35 by placing arrays of connector locations onto module plates 37. The module plates 37 and connector arrays are configured to fit a window 14 formed in the back portion 13. The output connector arrays may be, for example, KTK/KLM-type output connectors 39 as shown in FIGS. 19–21, or GMT-type output connectors 41 as shown in FIGS. 22–24. The module plates may be L-shaped, C-shaped or other as desired for mounting to the panel 1. The output connectors 39 and 41 may be screw-down barrier terminal strip type connectors or a set-screw barrel terminal strip or even ring terminals, or other connector types. An alarm output connector module 43 may also be included as shown in FIGS. 25–27. The alarm output connectors 43 may be connected to remote devices to signal when a power or fuse (or other circuit protection element) failure has occurred.

The back portion 13 is also configured with power input windows 12 to receive power input connectors 47. The power input connectors 47 are configured to accept electrical power supply lines. The power input connectors 47 may be configured as two hole compression lug-stud type connections or set screw barrel connections or other connectors known in the art. A protective rear panel 57 is used as a safety precaution to cover the power input connectors 47 and the output connectors 39, 41 and 43.

FIGS. 7–10 show a KTK/KLM-type fuse holder module 15' configured according to the present invention. The lower flange surface 20 is extended to accommodate a fuse alarm board 45 which may be configured to connect the KTK/KLM-type fuse 25 and an alarm LED 49. FIGS. 11–14 show a GMT fuse holder module 15" also configured with an alarm LED. GMT module 15" includes designation pin holders 22 in a vertical line for holding a designation pin (peg) 23 for each fuse holder to provide indicia as to the fuse type inserted into the fuse holder location. A preferred location for LED's 49 is along a lower portion of panel 1. Such a feature is advantageous because panel 1 is typically located higher in the rack, so viewing of lower LED's 49 is more convenient to the user. FIGS. 15–18 show a power on LED module 29 for signaling when the panel is receiving power. The panel may be configured as shown in FIG. 31 to receive dual power inputs, therefore the power on LED module shown in FIGS. 15–18 may include a power on indicator LED 51 for each power input.

The modules 15' and 15" are generally C-shaped members which define a circuit holder in front section 21. Front section 21 is formed to include a hole for receipt of the desired fuse holder or other circuit element to be mounted thereto by fasteners or other mounting mechanisms. A blank module 15''' is shown in panel 1 at the left end. LED module 29 and blank module 15''' are also C-shaped.

Figure 29:
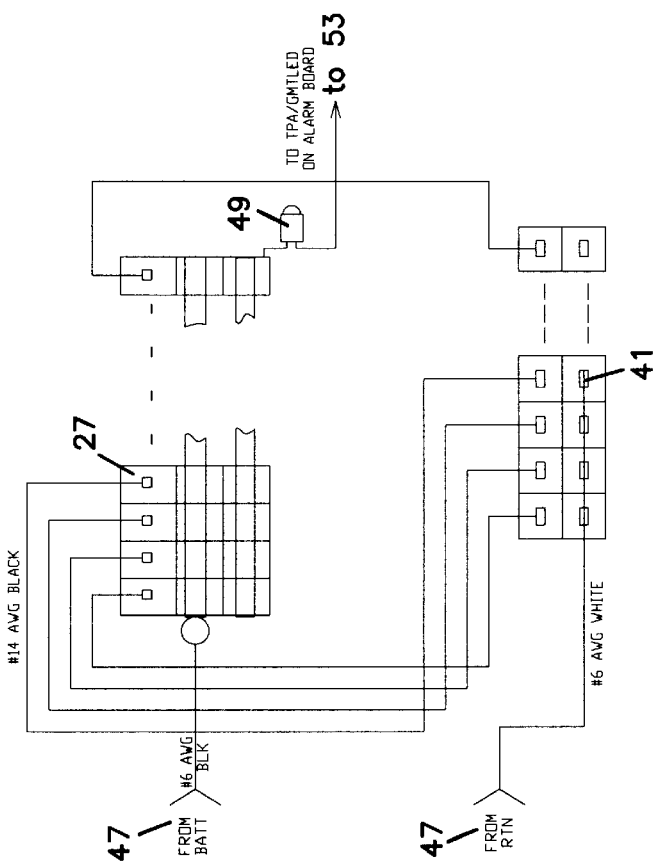
FIG. 29 is a circuit diagram of a circuit used in a power distribution panel of the present invention with GMT fuses.
Figure 28B:
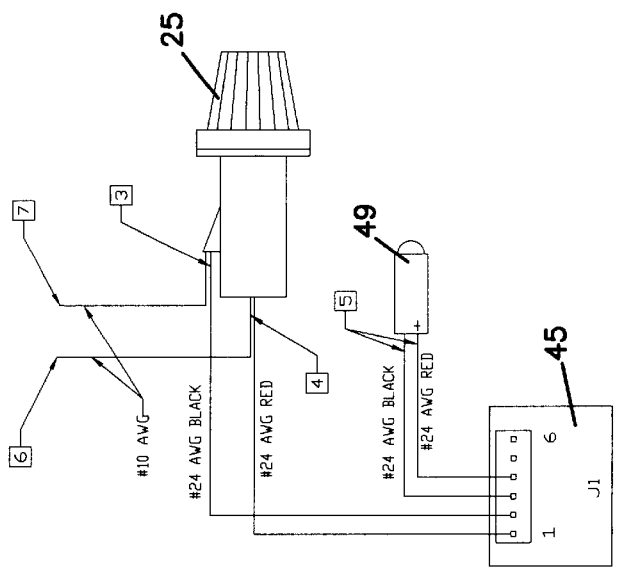
Figure 30:
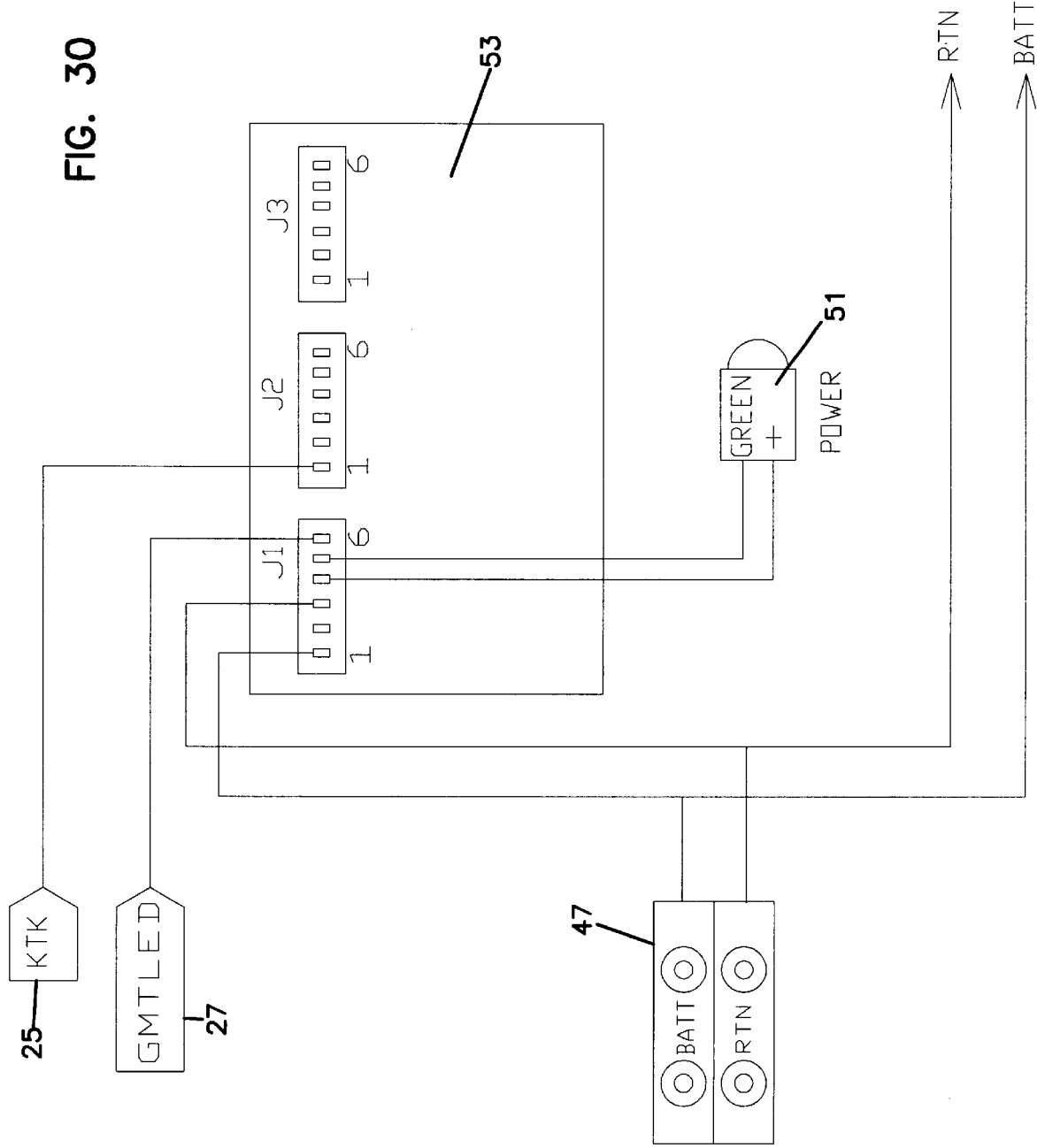
FIG. 30 is a circuit diagram of an alarm board circuit used in a power distribution panel of the present invention.
Figure 31:
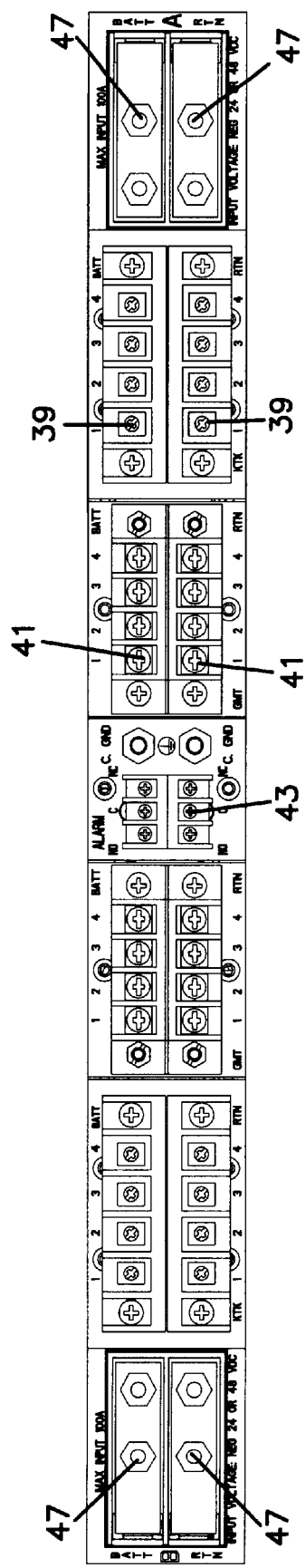
FIG. 31 is a rear view of the preferred embodiment of the power distribution panel of FIG. 1 with the protective panel removed.

The power input connectors 47 shown in FIG. 31 are connected to the fuses of the circuit element modules 15 and thereby to the power output connectors by means of an electrical circuit. The circuit will vary depending on the configuration of the circuit element modules 15 and the output connector modules 35 selected and may include a panel alarm board 53. The preferred circuit links the power input to the power output connectors through the fuse or other circuit protecting components. The preferred circuit also provides alarm and status signals to the user, such as "power on," and "fuse blown." FIGS. 28A and B show a typical electrical circuit for connecting an array of KTK fuses to the power input connectors 47, the KTK alarm boards 45, and KTK output connectors 39. FIG. 29 shows a typical electrical circuit for connecting an array of GMT fuses to the power input connectors 47, the GMT output connectors 41, the alarm LED 49 on the GMT module, and the panel alarm board 53. FIG. 30 shows a typical electrical circuit connecting the alarm board 53 to the power input connections 47 and power on indicator LED 51.

A manufacturer of a circuit panel according to the present invention may also manufacture and supply to the panel user, circuit element modules 15 which have been pre-wired for installation. Pre-wired modules also simplify assembly by the manufacturer. Circuit element modules 15 can be electrically connected to appropriate wires with connectorized ends by the manufacturer, to facilitate easy assembly. See for example leads 61 in FIG. 8.

As described above the power distribution panel is modularized both in that the circuit elements such as fuses and circuit breakers are modularized, and in that the output connectors are modularized. As shown in FIG. 33, a total front access power distribution panel 1' can be constructed according to the present invention which would provide for modular circuit elements 15' and 15" as well as output connectors 39 and 41 and alarm connectors 43 on the front. An appropriately configured front housing 66 includes structure for attaching to each of the modules, whether they are C-shaped or planar shaped.

The present invention may include ventilation slots 55 in the top panel of the unit housing. Alternatively or in combination the top panel may comprise a heat sink, such as described in U.S. application Ser. No. 09/527,897, filed Mar. 20, 2000, and the disclosure of which is hereby incorporated by reference.

Although not required, in the preferred embodiment it should be noted that the blanks 15''' are shorter in length than modules 15' 15". Blanks 15''' are equal in length to LED module 29. If longer modules 15 are used, multiple fasteners may be employed, such as through holes 31a in the case of a 3 unit fuse module. Holes 31a are not used in the illustrated panel 1 with the various illustrated modules 15, 29.

The panel 1 of the present invention includes a configurable front end, and possibly a configurable back end for the various circuit modules, alarm/signal modules, and the connector modules for configuring the panel to have the desired functions. Such a construction allows for efficient inventory management, and more timely delivery of varied panels to customers. For example, the user can specify one or more of the following: front/rear access; input power connector type; fuse/circuit breaker types and numbers, output power connector type(s); alarm signal connector type(s); and the alarm signal type(s). By maintaining one or more styles of chassis, and an inventory of components, the different panels can be conveniently assembled.

The above specification, examples and data provide a description of the invention. Since many embodiments of the invention can be made without departing from the spirit and scope of the invention, the invention resides in the claims hereinafter appended.

What is claimed is:

1. A power distribution panel comprising:
   a housing having a back, top, bottom and two opposed side surfaces, the back surface configured with a power input connector and an array of power output connectors, the housing defining an open front end opposite the back surface for receiving circuit element modules, the housing also defining an interior of the power distribution panel;

a plurality of circuit element modules coupled to the housing at the open end of the housing, wherein the circuit element modules comprise a circuit element disposed on a module member, the module member being configured to span from the top to the bottom of the open end of the housing, closing at least a portion of the open front end, and further, wherein at least one circuit element module is a fuse module;

an electrical circuit disposed within the interior of the power distribution panel, the electrical circuit electrically connecting the power input connector and the power output connectors to the circuit elements of the circuit element modules.

2. The power distribution panel of claim 1, wherein the module members are C-shaped having upper and a lower flange surfaces, the upper flange surface defining a first fastener hole for securing the modular member to the top surface of the housing of the power distribution panel, the lower flange surface defining a second fastener hole.

3. The power distribution panel of claim 2, wherein the second fastener hole is displaced from an axis defined by the first fastener hole of the upper flange surface, the axis being perpendicular to the upper and lower flange surfaces.

4. The power distribution panel of claim 2, wherein the lower flange surfaces of the module members are recessed to receive the bottom surface of the housing, wherein the lower flange surface of the module members and the bottom surface of the housing form a generally planar bottom side for the panel.

5. The power distribution panel of claim 4, wherein the top surface of the housing is recessed to receive an upper flange surface of the module members, wherein the upper flange surface of the module members and the top surface form a generally planar top side for the panel.

6. The power distribution panel of claim 2, wherein the top surface of the housing is recessed to receive an upper flange surface of the module members, wherein the upper flange surface of the module members and the top surface form a generally planar top side for the panel.

7. The power distribution panel of claim 1, wherein at least one of the circuit element modules includes an LED power on indicator and at least one of the following circuit elements: a GMT fuse holder location, a KTK fuse holder location, a circuit breaker.

8. The power distribution panel of claim 1, further comprising module members without circuit elements, the module members being coupled to the open front end of the unit housing.

9. The power distribution panel of claim 1, further comprising brackets configured and arranged for mounting the housing to a support structure.

10. A power distribution panel comprising:

a housing having a back, top, bottom and two side surfaces, the housing defining an open end opposite the back surface for receiving circuit element modules, the housing also defining an interior of the power distribution panel;

a plurality of circuit element modules coupled to the housing at the open end of the housing, wherein each circuit element module comprises a circuit element disposed on a module member, the module members being configured to fit adjacent to the open end of the housing, the module cooperating to close the open end, and further, wherein the plurality of circuit element modules includes at least one power input connector module, at least one power output connector array module and a plurality of fuse modules;

an electrical circuit disposed within the interior of the power distribution panel, the electrical circuit electrically connecting the power input connector module and the power output connector array module to the circuit elements of the other circuit element modules.

11. The power distribution panel of claim 10, wherein the circuit element modules include a power output connector array, a power input connection, an LED power on indicator, and a fuse alarm indicator, and at least one of the following circuit elements: a GMT fuse holder location, a KTK fuse holder location, a circuit breaker.

12. The power distribution panel of claim 10, further comprising brackets configured and arranged for mounting the housing to a support structure.

13. A power distribution panel comprising:

a housing having a top, bottom, back and two side surfaces, the housing defining a front end and a back end opposite the front end, the front end and the back end configured for receiving circuit modules, the housing also defining interior of the power distribution panel;

a plurality of circuit modules coupled to the housing at tie front end and the back end of the housing, wherein each circuit module comprises a circuit element disposed on a module member, the module members being configured to close off the ends of the housing, and flier, wherein the plurality of circuit modules includes a power input connector module at the back end, an output connector array module at the back end, and a plurality of fuse modules at the front end;

an electrical circuit disposed within tie interior of the power distribution panel, the electrical circuit electrically connecting the power input connector module and the output connector array module to the circuit elements of the remaining circuit modules.

14. The power distribution panel of claim 13, wherein the fuse modules are C-shaped having an upper flange surface and a lower flange surface, the upper flange surface and the lower flange surface each defining a fastener hole for securing the fuse members to the top surface of the housing of the power distribution panels.

15. The power distribution panel of claim 15, wherein the lower flange surfaces of the fuse modules are recessed to receive the bottom surface of the housing, wherein the lower flange surface of the fuse modules and the bottom surface of the housing form a generally planar bottom side for the panel.

16. The power distribution panel of claim 15, wherein the top surface of the housing is recessed to receive an upper flange surface of the module members, wherein the upper flange surface of the module members and the top surface form a generally planar top side for the panel.

17. The power distribution panel of claim 16, wherein the top surface of the housing is recessed to receive an upper flange surface of the module members, wherein the upper flange surface of the module members and the top surface form a generally planar top side for the panel.

18. The power distribution panel of claim 13, wherein the circuit element modules include a power output connector array, a power input connection, an LED power on indicator, and a fuse alarm indicator, and at least one of the following circuit elements: a GMT fuse holder location, a KTK fuse holder location, a circuit breaker.

19. The power distribution panel of claim 13, further comprising brackets configured and arranged for mounting the housing to a support structure.

20. A fuse module for use in a power distribution panel, the module comprising:

a fuse;

an LED indicator;

a module member having upper and lower flange surfaces connected by a front surface, the upper and lower flange surfaces being generally perpendicular to the front surface, and extending from the front surface in tee same direction and opposing one another, the upper surface defining a fastener hole for coupling the fuse module to a fuse panel, the front spice defining a fuse hole for receiving the fuse, He front surface further defining a fuse alarm hole for receiving the LED indicator, the lower flange surface defining a second fastener hole.

21. A KTK fuse module for use in a power distribution panel, the module comprising:

a KTK fuse;

an LED indicator;

a module member having upper and lower flange surfaces connected by a front surface, the upper and lower flange surfaces being generally perpendicular to the front surface, the upper surface defining a fastener hole for coupling the fuse module to a fuse panel, the front surface defining a fuse hole for receiving the KTK fuse, the front surface further defining a fuse alarm hole for receiving the LED indicator, the lower flange surface defining a second fastener hole displaced from an axis defined by the upper flange surface's fastener hole, the axis being perpendicular to the upper and lower flange surface, he lower flange surface being recessed to fit a power distribution panel;

a fuse alarm circuit board mounted to the lower flange surface, the LED indicator connected to the fuse alarm circuit board.

22. A GMT fuse holder location module for use in a power distribution panel, the module comprising:

a set of GMT fuse holder locations;

an LED indicator;

a module member having upper and lower flange surfaces connected by a front surface, the upper surface defining a fastener hole for coupling the fuse module to a fuse panel, the front surface defining a fuse holder hole for receiving a set of fuse holder locations, the front surface further defining a fuse alarm hole for receiving the LED indicator, the lower flange surface defining a second fastener hole displaced from an axis defined by the upper flange surface's fastener hole, the axis being perpendicular to the upper and lower flange surfaces, the lower flange surface being recessed to fit a power distribution panel.

23. The GMT fuse holder location module of claim 22, wherein the front surface defines a set of holes for receipt of a set of fuse designation pins.

24. A chassis for forming a fuse panel comprising:

a housing having a back, top, bottom and two opposed side surfaces, the back surface configured with a power input connector and an array of power output connectors, the housing defining an open front end opposite the back surface for receiving circuit element modules, the housing also defining an interior of the power distribution panel;

the open front end defined by front parallel edges spaced apart and facing one another, each edge including a repeating pattern of fastener holes.

* * * * *

UNITED STATES PATENT AND TRADEMARK OFFICE
CERTIFICATE OF CORRECTION

PATENT NO.    : 6,456,203 B1
DATED         : September 24, 2002
INVENTOR(S)   : Schomaker et al.

It is certified that error appears in the above-identified patent and that said Letters Patent is hereby corrected as shown below:

Column 8,
Line 19, "also defining interior" should read -- also defining an interior --
Line 21, "tie" should read -- the --
Line 25, "flier" should read -- further --
Line 30, "tie" should read -- the --
Line 41, "panel of claim 15," should read -- panel of claim 14, --

Column 9,
Line 8, "tee" should read -- the --
Line 10, "spice" should read -- surface --
Line 11, "He" should read -- the --
Line 30, "surface" should read -- surfaces --
Line 30, "he" should read -- the --

Signed and Sealed this

Fourth Day of March, 2003

JAMES E. ROGAN
*Director of the United States Patent and Trademark Office*